March 11, 1924.

J. B. HUMPERT

UNIVERSAL JOINT FOR PISTONS

Filed March 8, 1922

1,486,752

INVENTOR
John B Humpert
BY
Miller Henry & Barkew
ATTORNEYS

Patented Mar. 11, 1924.

1,486,752

UNITED STATES PATENT OFFICE.

JOHN B. HUMPERT, OF SAN FRANCISCO, CALIFORNIA.

UNIVERSAL JOINT FOR PISTONS.

Application filed March 8, 1922. Serial No. 542,180½.

*To all whom it may concern:*

Be it known that I, JOHN B. HUMPERT, a citizen of the United States, and a resident of the city and county of San Francisco, State of California, have invented new and useful Improvements in Universal Joints for Pistons, of which the following is a specification.

My invention has for its object the provision of a universal joint by which the piston rod of an engine is connected to the piston head so as to secure easy flexibility of movement of the piston head on the rod, so that the head may readily adapt itself to any position, so as to secure its alignment with the cylinder at all times, and to permit a slow rotative movement within the cylinder, or a circular displacement whenever desired, and in order to secure a more even wear on the piston and within the cylinder, also the avoidance of openings in the side of the piston walls as has heretofore been the practice in using crank pins.

Also by my joint I secure a more perfect lubrication, more rigid construction, and efficient operation.

Other objects will appear from the drawings and specification which follow:

Throughout the figures similar numerals refer to identical parts.

The cylinder of a well known type of internal explosion engine is shown at 1, the other part of the engine not being shown, but well known in the art, and such an engine usually consists of four or more of such cylinders as here shown. The explosive mixture during the down portion of the stroke is received from a passage as 2, through the valve 3, which is caused to raise by suitable well known cam mechanism preferably connected with the crank shaft, not shown.

Figure 1:
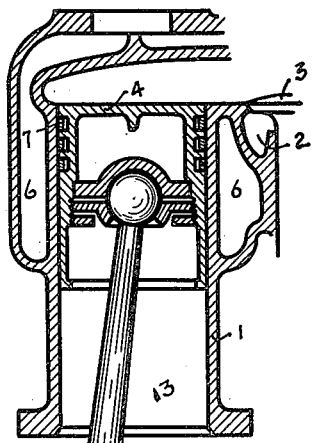
Fig. 1 is a cross section of a portion of an internal explosion engine employing my invention.

After the piston 4 by its downward movement has taken in the explosive mixture from the passage 2 during the period of the valve 3 being open, the valve 3 closes and the mixture is then compressed by the return movement of piston 4 until it occupies substantially the position shown in Fig. 1, at which time the mixture is exploded as by a spark plug, not shown, but also well known. The explosion forces the piston downward. When it has arrived at its complete down position and received the full impulse from the explosion and converted same into the turning effort of the crank 5, a discharge valve similar to the inlet valve 3 is automatically opened through the aforesaid cam shaft, and the exploded mixture is then forced out by another return movement of the piston 4, there thus being two complete revolutions of the crank 5 to each explosion.

The passage 6, 6 embracing the upper portion of the heat cylinder is for the purpose of circulating water about the cylinder to prevent its overheating. The piston 4 is preferably provided with the usual snap rings as 7 and is recessed at 8 for receiving the bearing plate 9, which plate is provided with a bearing surface 10 and holes as 11, by which any expansion or contraction of the air or gases contained in the chamber 12 are equalized with the crank case pressure as at 13.

The interior of the piston 4 is preferably threaded as at 14 and the companion bearing plate 15 correspondingly threaded to secure its concentric assembly with the bearing plate 9, which assembly takes place about the spherical member 16. The latter is mounted upon the crank rod 17 as by the threads 18 and locked thereto as by the pin 19, thus providing a universal joint for the rod 17.

The plate 15 is provided with a series of relatively large holes as 20 to facilitate the oiling of this universal joint, the said oiling occurring, as by splash, within the space 21 when the oil finds its way through the said holes 20, and between the bearing plates and into the groove 22, this latter thus providing an oil storage or reservoir for continually feeding the spherical joint. Oil is also splashed against the surface 23.

The bearing plate 15 is passed over the rod 17 before the ball 16 is assembled on its threads 18 and it is then locked by the pin 19; and the plate 15 is then screwed in place by engagement with the threads 14. There is now fitted over the said bearing plate 15 the washer 24.

The screw threads 14 and the piston 4 have a keyway 25 cut therein and adapted to engage the key projection 26 of the washer 24. Similar keys project from the interior of the washer as at 27, one or more of which may be caused to engage with one or more of the key ways in the locking nut 29; which locking nut is finally assembled on top of the said washer and locked securely in position against the assembled bearing half 15, and I prefer to form in the said lock nut spanner holes as 30 for the purpose of assembling.

Figure 2:
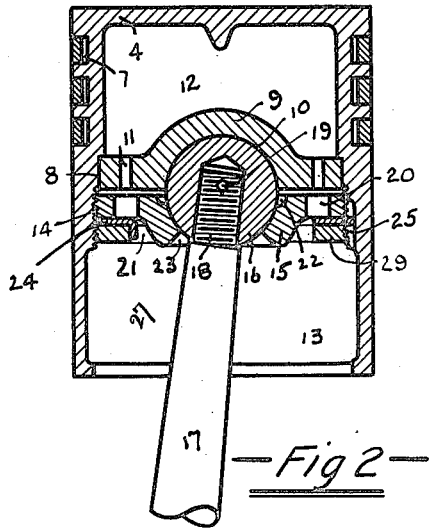
Fig. 2 is an enlarged detail of the piston and universal joint of my invention.
Figure 3:
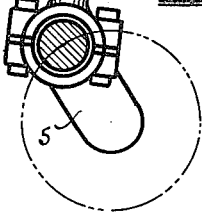
Fig. 3 is an inverted plan view of Fig. 2.
Figure 4:
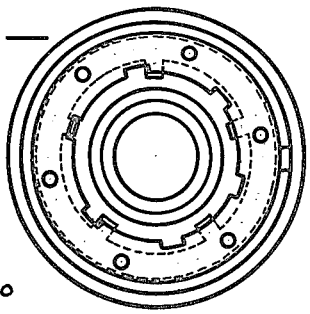
Fig. 4 is a detail of the lock washer.
Figure 4:
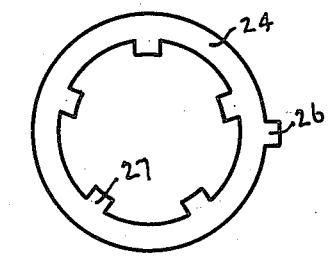
Figure 6:
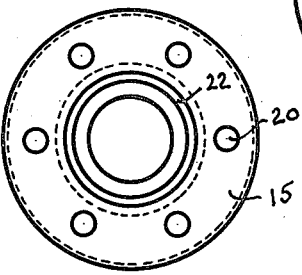
Fig. 6 is a detail plan view of one half of the joint bearing.

In Fig. 2 the key 27 of the washer 24 is shown bent into locked position with the key-way 28 of the lock nut 29, the key 26 preventing the rotation of the lock washer and therefore of the lock nut, which two members being securely locked against the bearing half 15 secures the latter in its adjusted position and retains the perfect assembly of the universal joint.

Figure 8:
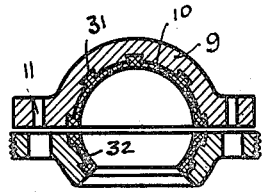
Fig. 8 is a cross section of a bearing showing a renewable lining therein.
Figure 5:
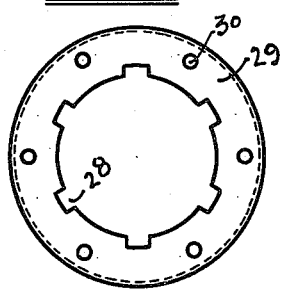
Fig. 5 is a detail of the lock nut.
Figure 7:
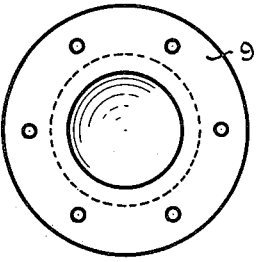
Fig. 7 is a detail plan view of the other half of the joint bearing.

The bearing halves 9 and 15 may be lined with babbitt or bronze liners as at 31, 32 of Fig. 8, if preferred.

It will be seen that the bearing halves are supported from the side walls of the piston and spaced from the upper closed end and against which the explosive pressure and heat contact and by this construction the said bearing is kept from the direct action of heat and lubrication is thereby prevented from being burned out. Also this spacing is secured without the addition of any other member or excess material. Lubrication is also maintained by oil splashing through the space 21 and holes 20 and an oil film is thus established and maintained between the plates 9 and 15 and therefore a continuous oil bath around the ball 16 which is thus kept lubricated at all times.

I claim:

1. A universal joint for a piston and rod, consisting of a concave member adapted to position centrally within the piston, a co-operating ball mounted on the end of the rod, a concave member adapted to enclose the remaining portion of the ball and provided with an opening through which the rod is adapted to reciprocate about the center of the said ball; holding means securing and locking the two said concave members about the ball, said means comprising a washer having a projecting key engaging a slot cut within said piston and a locking nut in screw thread engagement with the said piston, and holding said washer in its locked position.

2. A universal joint for a piston and rod, consisting of a concave member adapted to position centrally within the piston, a co-operating ball mounted on the end of the rod, a concave member adapted to enclose the remaining portion of the ball and provided with an opening through which the rod is adapted to reciprocate about the center of the said ball; holding means securing and locking the two said concave members about the ball, said means comprising a washer having a projecting key engaging a slot cut within said piston and a locking nut in screw-thread engagement with the said piston, and holding said washer in its locked position, and a tongue and co-operating groove between said locknut and said washer whereby the nut is locked from rotation.

JOHN B. HUMPERT.